United States Patent
Suchindran et al.

(10) Patent No.: US 12,235,709 B2
(45) Date of Patent: Feb. 25, 2025

(54) COGNITIVE THERMAL AND POWER MANAGEMENT OF INFORMATION HANDLING SYSTEMS (IHSS)

(71) Applicant: Dell Products, L.P., Round Rock, TX (US)

(72) Inventors: Vaishnavi Suchindran, Bangalore (IN); Ravi Shekhar Singh, Bangalore (IN); Sherwin Lewis, Mumbai (IN); Vineet Kumar Pandey, Meghmau (IN)

(73) Assignee: Dell Products, L.P., Round Rock, TX (US)

( * ) Notice: Subject to any disclaimer, the term of this patent is extended or adjusted under 35 U.S.C. 154(b) by 36 days.

(21) Appl. No.: 18/184,233

(22) Filed: Mar. 15, 2023

(65) Prior Publication Data

US 2024/0310896 A1 Sep. 19, 2024

(51) Int. Cl.
| G06F 1/00 | (2006.01) |
| G06F 1/3206 | (2019.01) |
| G06F 1/3234 | (2019.01) |
| G06F 1/3203 | (2019.01) |

(52) U.S. Cl.
CPC .......... G06F 1/3234 (2013.01); G06F 1/3206 (2013.01); *G06F 1/3203* (2013.01)

(58) Field of Classification Search
CPC .............................. G06F 1/3234; G06F 1/3206
USPC ....................................................... 713/323
See application file for complete search history.

(56) References Cited

U.S. PATENT DOCUMENTS

| 6,744,295 | B2* | 6/2004 | Miyagi | H03K 3/0375 |
| | | | | 327/143 |
| 7,080,593 | B1* | 7/2006 | Frankel | A47J 36/32 |
| | | | | 99/333 |
| 10,892,618 | B1* | 1/2021 | Cooper | H04L 12/2816 |
| 12,000,321 | B1* | 6/2024 | Wilks | F01N 3/24 |
| 2003/0107422 | A1* | 6/2003 | Miyagi | H03K 17/223 |
| | | | | 327/215 |
| 2007/0080707 | A1* | 4/2007 | Brinkman | H01L 23/34 |
| | | | | 257/E23.08 |
| 2014/0119749 | A1* | 5/2014 | Mashiki | G03G 15/2039 |
| | | | | 399/33 |
| 2014/0245032 | A1* | 8/2014 | Vadakkanmaruveedu | ........... |
| | | | | G06F 1/324 |
| | | | | 713/300 |
| 2016/0109485 | A1* | 4/2016 | Haefner | G01K 7/00 |
| | | | | 324/750.03 |
| 2016/0282928 | A1* | 9/2016 | Shabbir | G06F 1/263 |

(Continued)

*Primary Examiner* — Volvick Derose
(74) *Attorney, Agent, or Firm* — Fogarty LLP (57) ABSTRACT

Systems and methods for cognitive thermal and power management of Information Handling Systems (IHSs) are described. In an illustrative, non-limiting embodiment, an IHS may include a processor and a memory coupled to the processor, the memory having program instructions stored thereon that, upon execution by the processor, cause the IHS to: receive temperature information from a plurality of Power Supply Unit (PSU) thermal zones within an enclosure of the IHS, identify, based at least in part upon the temperature information, that a first PSU thermal zone is cooler than a second PSU thermal zone, or that the second PSU thermal zone is hotter than the first PSU thermal zone, and, in response to the identification, set a first PSU located in the first PSU thermal zone to active mode and set a second PSU in the second PSU thermal zone to standby.

20 Claims, 3 Drawing Sheets

(56) References Cited

U.S. PATENT DOCUMENTS

| | | | |
|---|---|---|---|
| 2017/0256532 A1* | 9/2017 | Lidsky | H02H 3/202 |
| 2018/0042095 A1* | 2/2018 | Kim | H05G 1/36 |
| 2019/0363563 A1* | 11/2019 | Zhang | B60L 58/27 |
| 2020/0236239 A1* | 7/2020 | Wada | H04N 1/00891 |
| 2020/0310519 A1* | 10/2020 | Ranta | G06F 1/26 |
| 2021/0232191 A1* | 7/2021 | O'Brien | H01M 10/633 |
| 2023/0116503 A1* | 4/2023 | Jamerson | H02J 7/007194 |
| | | | 307/66 |
| 2023/0228823 A1* | 7/2023 | Valmonte | G06F 1/28 |
| | | | 713/300 |

* cited by examiner

COGNITIVE THERMAL AND POWER MANAGEMENT OF INFORMATION HANDLING SYSTEMS (IHSS)

FIELD

This disclosure relates generally to Information Handling Systems (IHSs), and more specifically, to systems and methods for cognitive thermal and power management of IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for cognitive thermal and power management of Information Handling Systems (IHSs) are described. In an illustrative, non-limiting embodiment, an IHS may include a processor and a memory coupled to the processor, the memory having program instructions stored thereon that, upon execution by the processor, cause the IHS to: receive temperature information from a plurality of Power Supply Unit (PSU) thermal zones within an enclosure of the IHS, identify, based at least in part upon the temperature information, that a first PSU thermal zone is cooler than a second PSU thermal zone, or that the second PSU thermal zone is hotter than the first PSU thermal zone, and, in response to the identification, set a first PSU located in the first PSU thermal zone to active mode and set a second PSU in the second PSU thermal zone to standby.

For example, the processor may include: a Power Management Unit (PMU), an Embedded Controller (EC), a Baseboard Management Controller (BMC), or a Chassis Management Controller (CMC). The temperature information may include a temperature of one or more IHS components located in each of the plurality of PSU thermal zones. And the temperature of the one or more IHS components may include: a first average temperature of a first IHS component, and a second average temperature of a second IHS component.

The first average temperature may be weighed by at least one of: (i) a location of the first IHS component in the enclosure, (ii) a size of the first IHS component, or (iii) a weight associated with the first PSU thermal zone, and the second average temperature may be weighed by at least one of: (i) a location of the second IHS component in the enclosure, (ii) a size of the second IHS component, or (iii) a weight associated with the second PSU thermal zone.

Additionally, or alternatively, the temperature of the one or more IHS components may include: a first maximum operating temperature of a first IHS component, and a second maximum operating temperature of a second IHS component.

At least one of the first or second IHS components may include: a Central Processing Unit (CPU), a Graphical Processing Unit (GPU), a Field-Programmable Gate Arrays (FPGA), an Application-Specific Integrated Circuit (ASIC), a programmable logic device (PLD), a Systems-on-Chip (SoC), a cryptographic accelerator, an Artificial Intelligence (AI) accelerator, a Tensor Processing Unit (TPU), or a hard drive.

The program instructions, upon execution, may cause the IHS to: identify, based at least in part upon the temperature information, that the second PSU thermal zone is cooler than the first PSU thermal zone, or that the first PSU thermal zone is hotter than the second PSU thermal zone; and in response to the identification, set the first PSU to standby and set the second PSU to active mode.

The program instructions, upon execution, may cause the IHS to set a third PSU located under the first PSU in the first PSU thermal zone to standby. The program instructions, upon execution, may cause the IHS to, in response to: (i) a hot spare feature being enabled, and (ii) a power consumption of the IHS being greater than a selected portion of a first power output of the first PSU, set the second PSU to active mode.

The program instructions, upon execution, may cause the IHS to select the first power output of the first PSU and a second power output of the second PSU based, at least in part, upon operating temperatures of the first and second PSUs. To select the first and second power outputs, the program instructions, upon execution, may cause the IHS to optimize power conversion efficiencies of the first and second PSUs based, at least in part, upon the operating temperatures of the first and second PSUs.

The program instructions, upon execution, may cause the IHS to: determine that a power conversion efficiency of the first or second PSUs with the hot spare feature enabled are lower than a power conversion efficiency of the first or second PSUs with the hot spare feature disabled, and disable the hot spare feature in response to the determination.

In another illustrative, non-limiting embodiment, a memory device may have program instructions stored thereon that, upon execution by a PMU, EC, BMC, or CMC of an IHS, cause the PMU, EC, BMC, or CMC to: determine that a first PSU thermal zone of the IHS is cooler than a second PSU thermal zone, or that the second PSU thermal zone is hotter than the first PSU thermal zone; and in response to the determination, set a first PSU located in the first PSU thermal zone to active mode, and set a second PSU in the second PSU thermal zone to standby.

The program instructions, upon execution, may cause the PMU, EC, BMC, or CMC to, in response to a power consumption of the IHS being greater than a selected percentage or fraction of a first power output of the first PSU, set the second PSU to active mode. The program instructions, upon execution, may cause the PMU, EC, BMC, or CMC to select the first power output of the first PSU and a second power output of the second PSU based, at least in part, upon operating temperatures of the first and second PSUs.

To select the first and second power outputs, the program instructions, upon execution, may cause the PMU, EC, BMC, or CMC to optimize power conversion efficiencies of the first and second PSUs based, at least in part, upon the operating temperatures of the first and second PSUs.

In yet another illustrative, non-limiting embodiment, a method may include determining that a first PSU thermal zone within an enclosure of an IHS is cooler than a second PSU thermal zone, or that the second PSU thermal zone is hotter than the first PSU thermal zone and, in response to the determination, selecting a first power output of a first PSU in the first PSU thermal zone and a second power output of the second PSU in the second zone based, at least in part, upon: (i) operating temperatures of the first and second PSUs, and (ii) temperatures of the first and second PSU thermal zones.

The method may also include comprising selecting the first and second power outputs to optimize power conversion efficiencies of the first and second PSUs. The method may further include determining that the power conversion efficiencies of the first and second PSUs are lower than a power conversion efficiency of the first PSU or second PSU operating alone and, in response to the determination, setting the first PSU or the second PSU to standby.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
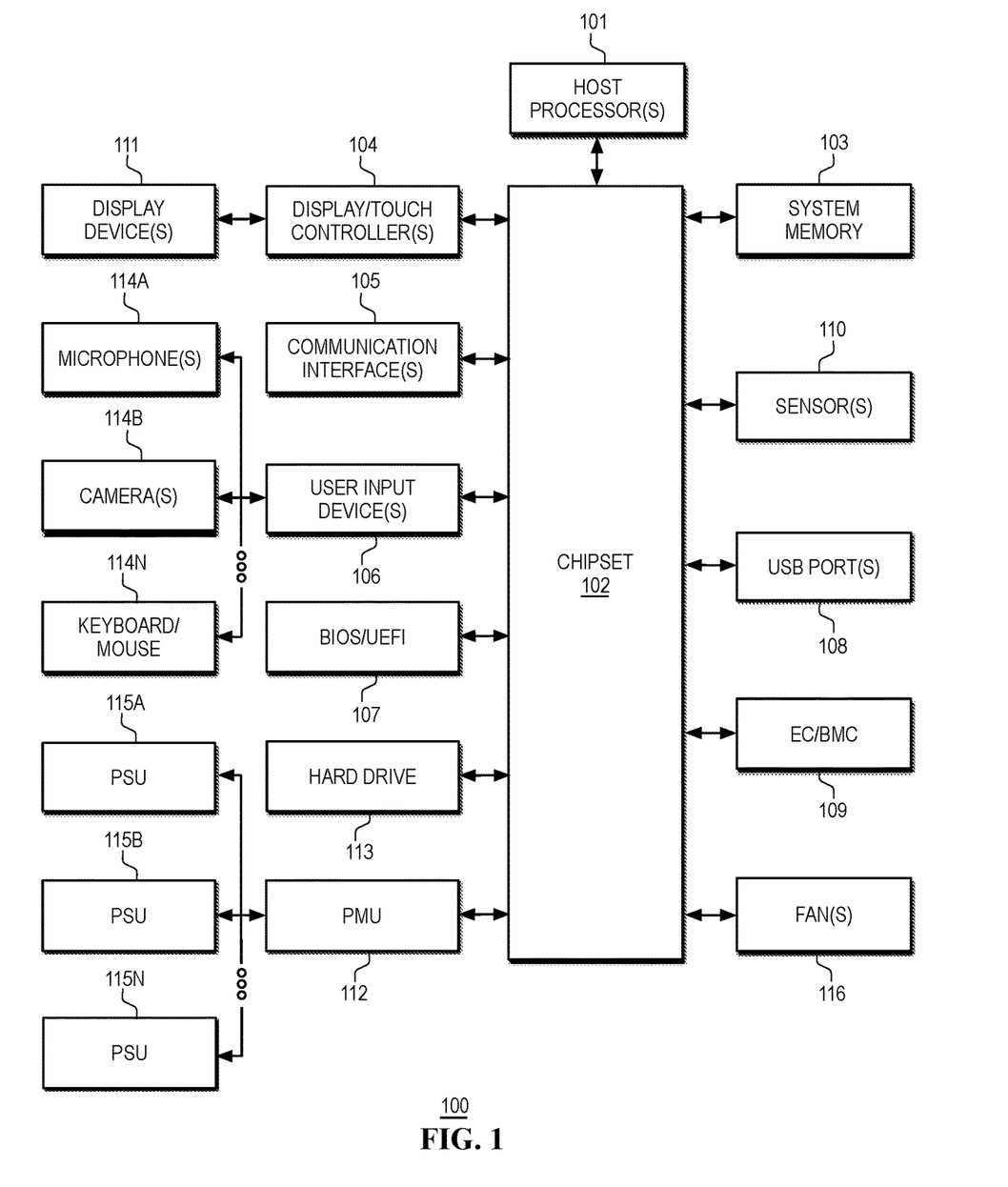
FIG. 1 is a block diagram illustrating examples of components of an Information Handling System (IHS), according to some embodiments.

FIG. 1 is a block diagram of components of an example IHS 100 (e.g., a server or the like). As depicted, IHS 100 includes host processor(s) 101. In various embodiments, IHS 100 may be a single-processor system, a multi-processor system including two or more processors, and/or a heterogeneous computing platform. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to hardware resources. In some cases, chipset 102 may utilize a QuickPath Interconnect (QPI) bus to communicate with host processor(s) 101.

For example, chipset 102 may be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may also be used to communicate with wireless peripheral devices. Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) port(s) 108, to which one or more peripheral devices may be coupled. Chipset 102 may further provide host processor(s) 101 with access to one or more hard disk drives, solid-state drives, optical drives, or other removable media drives 113.

Chipset 102 may provide access to one or more user input device(s) 106, for example, using a super I/O controller or the like. Examples of user input devices 106 include, but are not limited to, microphone(s) 114A, camera(s) 114B, and keyboard/mouse 114N. Other user input device(s) 106 may include a touchpad, trackpad, stylus or active pen, dial totem, etc.

Each of user input device(s) 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output device(s).

In certain embodiments, chipset 102 may further provide an interface for communications with hardware sensor(s) 110.

Sensor(s) 110 may be disposed on or within the chassis of IHS 100, or otherwise coupled to IHS 100, and may include, but are not limited to: electric, magnetic, radio, optical, light (e.g., Ambient Light Sensor or "ALS"), infrared, temperature (e.g., thermistors, etc.), proximity (e.g., User Presence Detection or "UPD"), location, etc.

Upon booting of IHS 100, host processor(s) 101 may utilize program instructions of Basic Input/Output System (BIOS) 107 to initialize and test hardware components coupled to IHS 100 and to load a host Operating System (OS) for use by IHS 100. BIOS 107 provides an abstraction layer that allows the host OS to interface with certain IHS components 100. Relying upon the hardware abstraction layer provided by BIOS 107, software stored in system memory 103 and executed by host processor(s) 101 can interface with certain I/O devices that are coupled to IHS 100.

Embedded Controller (EC) or Baseboard Management Controller (BMC) 109 is operational from the very start of each IHS power reset and handles various tasks not ordinarily handled by host processor(s) 101. Additionally, or alternatively, in the case of a modular architecture or rack, EC/BMC 109 may include a Chassis Management Controller (CMC) or the like.

Examples of EC/BMC 109 operations may include, but are not limited to: receiving and processing signals from a keyboard or touchpad, as well as other buttons and switches (e.g., power button, laptop lid switch, etc.), receiving and processing thermal measurements (e.g., performing fan control, CPU and/or GPU throttling, and emergency shutdown), controlling indicator LEDs (e.g., caps lock, scroll lock, num lock, battery, power, wireless LAN, sleep, etc.), managing Power Management Unit (PMU) 112, Power Supply Units (PSUs) 115A-N, and/or fan(s) 116, allowing remote diagnostics and remediation over a network, etc.

Firmware instructions utilized by EC/BMC 109 may also be used to provide various core operations of IHS 100, including the management of certain modes of IHS 100 (e.g., turbo modes, maximum operating clock frequencies of certain components, etc.). In some cases, EC/BMC 109 may be installed as a Trusted Execution Environment (TEE) component to motherboard 201 (FIG. 2) of IHS 100.

In various embodiments, EC/BMC 109 and/or Power Management Unit (PMU) 112 may be configured to implement aspects of systems and methods for cognitive thermal and power management of IHS 100, as described in more detail below.

In various embodiments, IHS 100 may be coupled to an external power source (e.g., AC outlet or mains) through PSUs 115A-N. Each of PSUs 115A-N may convert mains AC to low-voltage regulated DC power for consumption of components of IHS 100. In general, PSUs 115A-N may have a specific maximum power rating, measured in volts or watts, and any suitable connectors and/or form factors.

In various implementations, PSUs 115A-N may include switched-mode power supplies. Moreover, in some cases, PSUs 115A-N may conform to the Advanced Technology extended (ATX) specification, and it may provide standby power (e.g., 5 V) so that standby operations on IHS 100 and selected peripherals are enabled.

In operation, PSUs 115A-N may be turned on and off by a signal from motherboard 201 (FIG. 2), PMU 112, and/or EC/BMC 109. Conversely, PSUs 115A-N provide signal(s) to motherboard 201, PMU 112, and/or EC/BMC 109 to indicate when their respective DC output voltages are within specifications, so that IHS 100 is able to safely power up and boot.

In some cases, PSUs 115A-N may include their own fans, independent of fan(s) 116. Moreover, PSUs 115A-N may include hot-plug or hot-swapping functionality that allows them to be inserted into and removed from one or more sockets in IHS chassis, enclosure, module, case, or housing 200 (FIG. 2) while IHS 100 is running.

PSUs 115A-N may also operate as redundant PSUs such that each of them may have the capacity to run IHS 100 on its own, which allows IHS 100 to operate even if one of PSUs 115A-N fails. In certain modes of operation, each of PSUs 115A-N may provide half or less (e.g., if N≥2) of the power needed by IHS 100. If one of PSUs 115A-N is powered off, the other one(s) may compensate to provide full power to IHS 100 to prevent or reduce downtime.

Additionally, or alternatively, each of PSUs 115A-N may selectively operate in active mode or inactive mode (e.g., "sleep" or "standby"), for example, under control of PMU 112, EC/BMC 109, and/or motherboard 201. When in active mode, a given one of PSUs 115A-N may actively provide its DC output to components of IHS 100, and when in standby the given one of PSUs 115A-N may provide 0 V; but may otherwise be ready to immediately supply its DC output to components of IHS 100 upon the request of PMU 112, EC/BMC 109, and/or motherboard 201.

Additionally, or alternatively, each of PSUs 115A-N may operate in "hot spare" mode, whereby if the power consumption of IHS 100 is less than a selected percentage X % (e.g., 50%) or fraction of the power rating and/or output power of a given one or more of PSUs 115A-N, that PSU may supply the entire load. However, if the power consumption of IHS 100 increases beyond X % (e.g., 60%), another PSU designated as a "hot spare" becomes active and supplies half of that load (e.g., each of two PSUs supplies 30%). When the power consumption of IHS 100 again decreases below beyond X %, the PSU designated as a "hot spare" re-enters standby and the given PSU begins to supply the entire load once again.

Generally, the power conversion efficiency of each of PSUs 115A-N decreases as its inlet temperature, operating temperature and/or IHS load increase. Conversely, the power conversion efficiency of each of PSUs 115A-N increases as its inlet temperature, operating temperature and/or IHS load increase.

PMU 112 governs power operations of IHS 100, including PSUs 115A-N, sometimes under supervision of control of EC/BMC 109. For example, PMU 112 may be configured to: monitor power connections, control power to other components, devices, or ICs, shut down components when they are left idle, control sleep and power functions (e.g., "on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform power source selection, voltage regulation, voltage supervision, undervoltage protection, power sequencing, etc. It may also include a DC-to-DC converter to allow dynamic voltage scaling, or the like.

In some embodiments, power draw measurements may be conducted with control and monitoring of power supply via PMU 112. Power draw data may also be monitored with respect to individual components or devices of IHS 100. Whenever applicable, PMU 112 may administer the execution of a power policy, or the like.

Figure 2:
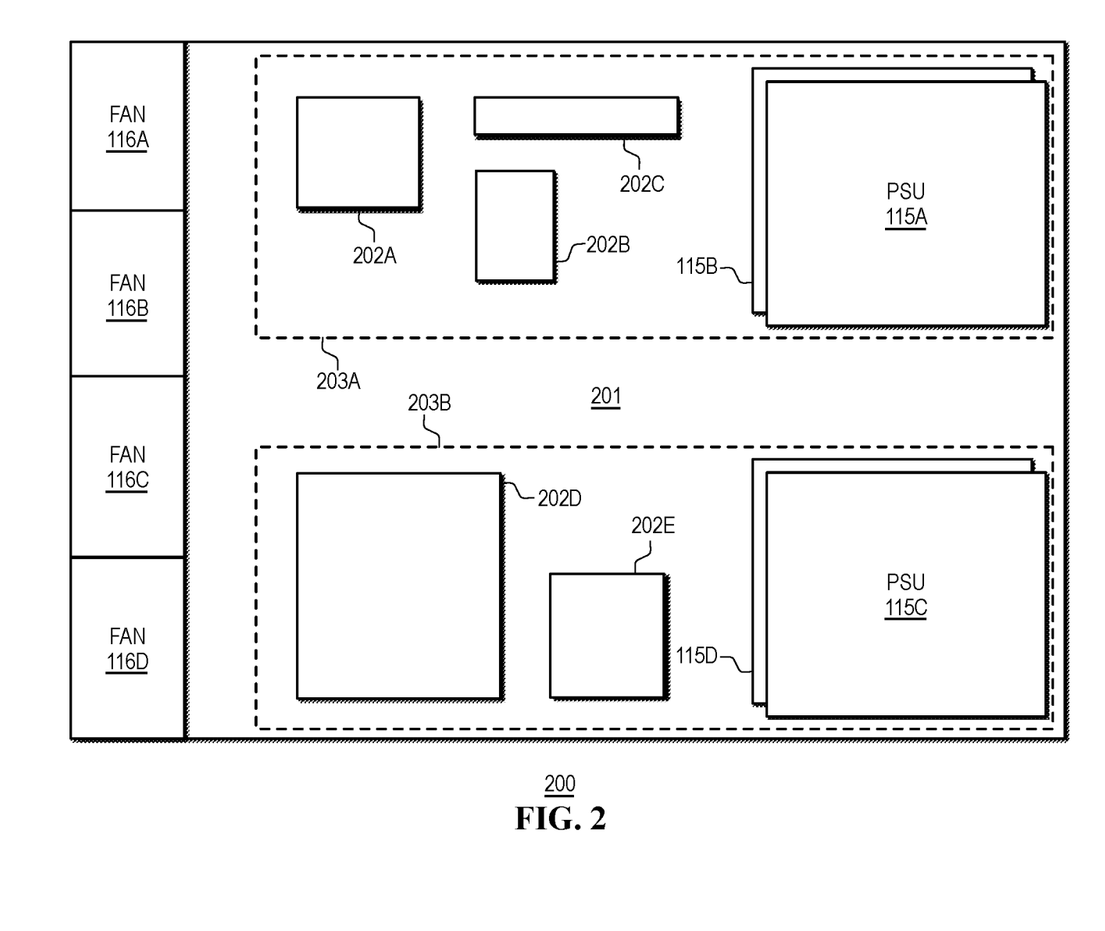
FIG. 2 is a diagram illustrating an example of an IHS chassis, enclosure, module, case, or housing including a plurality of Power Supply Unit (PSU) thermal zones, according to some embodiments.

IHS 100 may also include one or more fan(s) 116 configured to cool down one or more components or devices of IHS 100 disposed inside chassis, enclosure, module, case, or housing 200 (FIG. 2). Fan(s) 116 may include any fan inside or coupled to IHS 100, and may be used for active cooling. Particularly, fan(s) 116 may draw cooler air into the IHS chassis from the outside, expel warm air from inside, and/or move air across a heat sink to cool a particular IHS component. In various embodiments, axial and/or centrifugal (blower/squirrel-cage) fans may be used.

Generally, the amount of airflow supplied by fan(s) 116 may be increased (e.g., by increasing their rotational speed) as the load on PSUs 115A-N increases in order to effectively cool down IHS 100, as highly loaded PSUs dissipate more heat. Moreover, as the inlet temperatures rise for a given PSU load, the airflow may also be increased.

Conversely, the amount of airflow supplied by fan(s) 116 may be reduced (e.g., by reducing their rotational speed) as the load on PSUs 115A-N decreases in order to save energy and/or for acoustic/noise reasons. As the inlet temperatures decrease for a given PSU load, the airflow may also be reduced.

In some implementations, IHS 100 may not include all the components shown in FIG. 1. In other implementations, IHS 100 may include other components. In yet other implementations, some components that are represented as separate components may instead be integrated with other components, such that all or a portion of the operations executed by them may instead be executed by the integrated component.

In various embodiments, systems and methods described herein may provide for a cognitive thermal and power management of IHS 100 (e.g., in a datacenter). For example, these systems and methods may help an Original Equipment Manufacturer (OEM) meet goals of their various environmental programs, including energy consumption, materials, and recyclability. To meet such goals, the inventors hereof have determined that the power dissipation and thermal cooling within IHS 100 must be "cognitive" or "smart," so as to provide efficient designs in terms of environmental compliance.

Accordingly, systems and methods described herein may decrease the overall power consumption of IHS 100 and provide suggestions (e.g., to a user of IHS 100, a systems administrator, an Information Technology Decision Maker or "ITDM," etc.) on ways to achieve better energy management.

As described below, PSU thermal zones may be defined within an IHS chassis, enclosure, module, case, or housing, and each PSU thermal zone may encompass one or more IHS components and one or more PSUs 115A-N (FIG. 1). Each PSU thermal zone may be intelligently monitored and managed to provide a PSU configuration that includes: (i) an active PSU selection; and/or (ii) a PSU loading ratio.

In some cases, the PSU configuration may be made dynamic to allow for improved energy management. For example, the active PSU selection and/or PSU loading may be decided algorithmically based on the temperature(s) reported by component(s) within the various PSU thermal zones.

EC/BMC 109 may execute program instructions (e.g., in firmware) which instantiate a thermal monitoring loop configured to identify, based at least in part upon PSU thermal zones, a desirable active PSU selection and/or PSU loading ratio. For instance, the thermal monitoring loop may calculate an efficiency achieved for different PSU configurations, and it may suggest or enforce an optimal configuration when a user, sys admin, or ITDM selects an energy efficiency profile, or the like, for IHS 100.

In other cases, IHS 100 may operate in cold environments and a desirable active PSU selection and/or PSU loading ratio may be different from the desirable active PSU selection and/or PSU loading ratio of hot (or average temperature) environments. Particularly, when the IHS chassis, enclosure, module, case, or housing needs to be heated to maintain its components operating within their specifications' temperatures, the aforementioned thermal monitoring loop may be configured to identify active PSU selection and/or PSU loading ratio that increases the chassis' temperature.

Incidentally, it should be noted that the use of PSU thermal zones as described herein is distinct from the conventional use of thermal zones, the latter being typically defined to keep components within their specifications' temperatures, but does not otherwise take power optimization and/or thermal waste reduction concerns into account. Similarly, the use of PSU thermal zones as described herein is distinct from conventional PSU power management techniques, which do not ordinarily account for IHS component temperatures.

FIG. 2 is a diagram illustrating an example of IHS chassis, enclosure, module, case, or housing 200 including a plurality of PSU thermal zones 203A and 203B defined on motherboard 201, according to some embodiments. As shown, IHS chassis 200 includes a plurality of fans 116A-D and a plurality of PSUs 115A-D. In other implementations, however, any number of fans and/or PSUs may be used, and they may be different from each other. Also, although two PSU thermal zones 203A and 203B are illustrated, any other suitable number of zones may be defined depending upon the thermal or mechanical design of IHS 100.

In this case, PSU thermal zone 203A encompasses selected IHS components 202A-C and PSUs 115A and 115B, whereas PSU thermal zone 203B encompasses selected IHS components 202D and 202E as well as PSUs 115C and 115D. Components 202A-E may include, but are not limited to: a CPU, a GPU, a Field-Programmable Gate Arrays (FPGA), an Application-Specific Integrated Circuit (ASIC), a programmable logic device (PLD), a Systems-on-Chip (SoC), a cryptographic accelerator, an Artificial Intelligence (AI) accelerator, a Tensor Processing Unit (TPU), a hard drive, etc.

Moreover, PSUs 115A and 115B are stacked upon each other, such that PSU 115A is disposed atop PSU 115B, and PSUs 115C and 115D are also stacked upon each other, such that PSU 115C sits atop PSU 115D.

In other implementations, however, any number of components may be assigned to any PSU thermal zone, for example, again depending upon the thermal and/or mechanical design of IHS 100. Also, specific arrangement of PSUs 115A-D within chassis 200 may also differ (e.g., side-by-side configuration, etc.).

Figure 3:
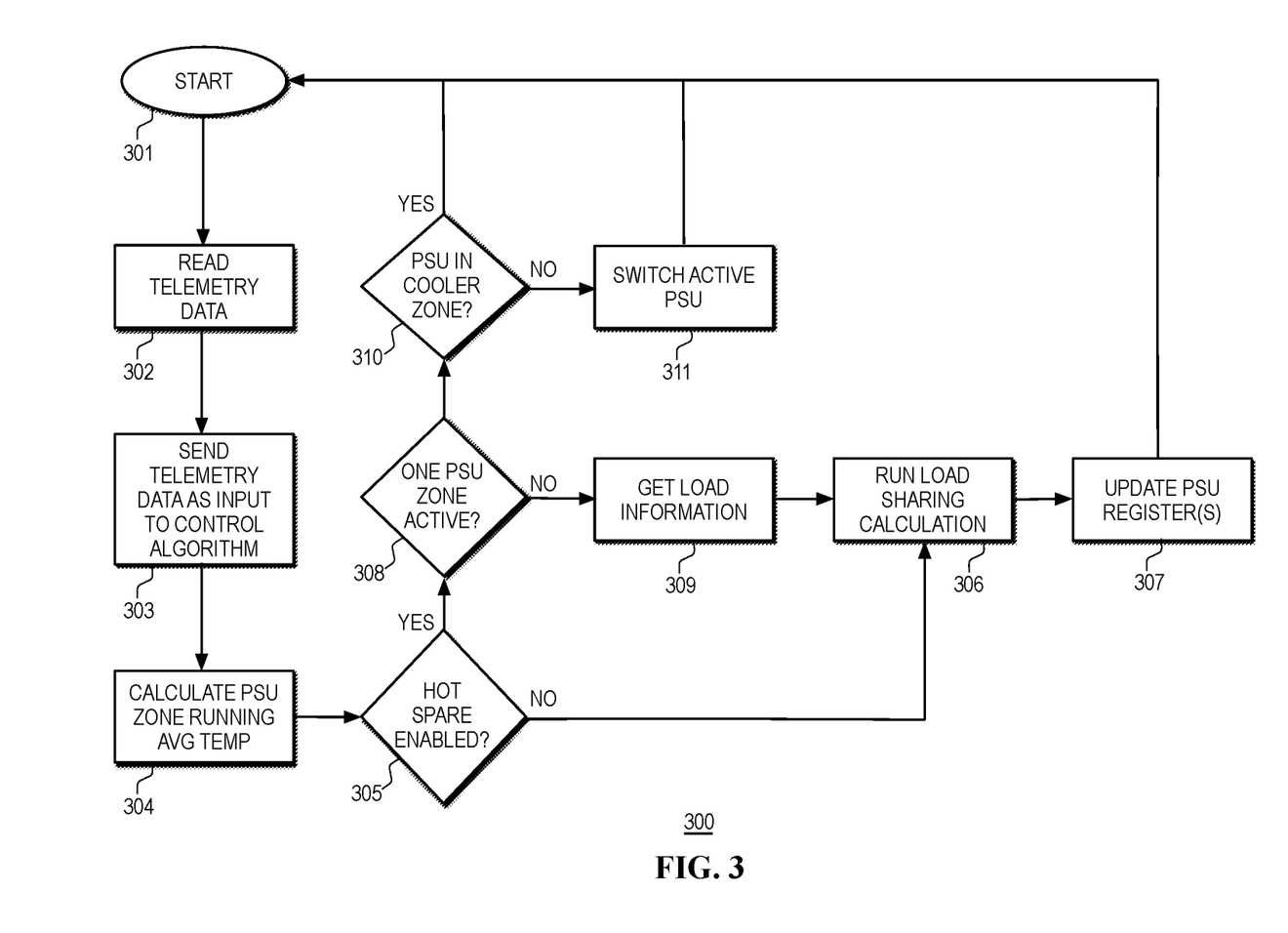
FIG. 3 is a flowchart illustrating an example of a method for cognitive thermal and power management, according to some embodiments.

In various embodiments, EC/BMC 109 (and/or PMU 112) may be configured, at least in part through its execution of firmware instructions, for example, to implement method 300 for cognitive thermal and power management of IHS 100 through the use of PSU thermal zones 203A and 203B.

FIG. 3 is a flowchart illustrating an example of method 300 for cognitive thermal and power management. In various embodiments, method 300 may be executed, at least in part, by EC/BMC 109 (and/or PMU 112).

In execution, method 300 may employ a thermal monitoring script to: categorize active IHS components based their respective PSU thermal zones, calculate an average temperature of each zone, and read PSU temperature and PSU load data from each PSU. Based at least in part upon one or more of these inputs, method 300 may identify an optimal active PSU selection and/or PSU load ratio. In some cases, method 300 may also be used to selectively enable or disable a "hot spare" feature.

Particularly, method 300 begins at 301. At 302, EC/BMC 109 may read telemetry data (e.g., temperature) collected by one or more hardware sensors 110 on motherboard 201 (e.g., thermistors, etc.) and/or as reported by IHS components 202A-E based upon their own internal sensors. At 303, EC/BMC 109 may send the telemetry data to a control algorithm.

At 304, EC/BMC 109 may calculate a PSU thermal zone running average temperatures for each of PSU thermals zones 203A and 203B. In some deployments, the temperature of each component within a PSU thermal zone may be weighed by: (i) a location of the IHS component in chassis 200, (ii) a size of the IHS component, and/or (iii) a weight associated with the component's respective PSU thermal zone. Additionally, or alternatively, the overall PSU thermal zone running temperatures may be weighed differently depending upon the zone and the types of components disposed therein.

At 305, EC/BMC 109 may determine whether a "hot spare" feature is enabled. If not, the control algorithm may, at 306, execute a load sharing calculation, for example, to optimize the operation of PSUs 115A-D based upon the PSU thermal zone running average temperatures using power conversion efficiency table(s) characteristic of each of PSUs 115A-D.

If the "hot spare" feature is determined to be enabled at 305, then EC/BMC 109 may determine whether there are more than one PSU thermal zones active (i.e., PSU thermal zones where at least one of its PSUs is in active mode) at 308. If not, at 309 EC/BMC 109 obtains electrical load information and control passes to the algorithm of 306; otherwise at 310 EC/BMC 109 determines whether the only active PSU thermal zone is in the coolest zone.

If at 310 EC/BMC 109 determines whether the only active PSU thermal zone is already in the coolest zone, control returns to 302. Otherwise, block 311 sets the currently active PSU to standby and sets another PSU to active mode in the coolest PSU thermal zone before control returns to 302.

Referring back to 306, the control algorithm of method 300 may produce a PSU loading ratio using the load sharing calculation. A resulting PSU loading ratio may then be used to update values stored in PSU register(s) at 307 (and/or sent to PMU 112) to set their respective power outputs to optimal load sharing levels based, at least in part, upon thermal zone temperatures and/or PSU power conversion efficiency tables.

In a first hypothetical cooling scenario with a high-temperature PSU thermal zone, method 300 may be executed to select an active PSU based upon PSU thermal zone performance such that it makes sure the active PSU is not in a GPU zone, and/or higher performing sleds are not in line with the active PSU. Front drives may also be placed in a way that allows maximum inflow of cold air toward a most heated zone. Moreover, in the case of stacked PSUs, method 300 may ensure that the active PSU is on top of other PSU(s).

In a second hypothetical heating scenario with a low-temperature PSU thermal zone, method 300 may be used as a closed loop control for PSU fans using feedback form PSU temperature sensors and/or system temperature sensors. Method 300 may recommend de-coupling system fans to make sure they are handled independently based upon placement. Fan control may be handled based upon thermal zone cooling requirements. For example, a CPU having a heat sink may operate without external fan at extreme low temperatures, yet certain types of memories (e.g., DDR, hard drives, etc.) may require a minimum amount of airflow to operate properly.

As such, systems and methods described herein may provide cognitive thermal and power management of Information Handling Systems (IHSs). These systems and methods may combine thermal and power management of IHS 100, for example, by creating serving operating profiles to achieve maximum energy efficiency and reduce operational costs.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution by the processor, cause the IHS to:
  receive temperature information from a plurality of Power Supply Unit (PSU) thermal zones within an enclosure of the IHS, wherein each PSU thermal zone comprises a different physical area or location of the enclosure;
  identify, based at least in part upon the temperature information, that a first PSU thermal zone is cooler than a second PSU thermal zone, or that the second PSU thermal zone is hotter than the first PSU thermal zone; and
  in response to the identification, set a first PSU located in the first PSU thermal zone to active mode and set a second PSU in the second PSU thermal zone to standby.

2. The IHS of claim 1, wherein the processor comprises: a Power Management Unit (PMU), an Embedded Controller (EC), a Baseboard Management Controller (BMC), or a Chassis Management Controller (CMC).

3. The IHS of claim 1, wherein the temperature information comprises a temperature of one or more IHS components located in each of the plurality of PSU thermal zones.

4. The IHS of claim 3, wherein the temperature of the one or more IHS components comprises: a first average temperature of a first IHS component, and a second average temperature of a second IHS component.

5. The IHS of claim 4, wherein the first average temperature is weighed by at least one of: (i) a location of the first IHS component in the enclosure, (ii) a size of the first IHS component, or (iii) a weight associated with the first PSU thermal zone, and wherein the second average temperature is weighed by at least one of: (i) a location of the second IHS component in the enclosure, (ii) a size of the second IHS component, or (iii) a weight associated with the second PSU thermal zone.

6. The IHS of claim 3, wherein the temperature of the one or more IHS components comprises: a first maximum operating temperature of a first IHS component, and a second maximum operating temperature of a second IHS component.

7. The IHS of claim 3, wherein at least one of the first or second IHS components comprises: a Central Processing Unit (CPU), a Graphical Processing Unit (GPU), a Field-Programmable Gate Arrays (FPGA), an Application-Specific Integrated Circuit (ASIC), a programmable logic device (PLD), a Systems-on-Chip (SoC), a cryptographic accelerator, an Artificial Intelligence (AI) accelerator, a Tensor Processing Unit (TPU), or a hard drive.

8. The IHS of claim 1, wherein the program instructions, upon execution, cause the IHS to:
  identify, based at least in part upon the temperature information, that the second PSU thermal zone is cooler than the first PSU thermal zone, or that the first PSU thermal zone is hotter than the second PSU thermal zone; and
  in response to the identification, set the first PSU to standby and set the second PSU to active mode.

9. The IHS of claim 1, wherein the program instructions, upon execution, cause the IHS to set a third PSU located under the first PSU in the first PSU thermal zone to standby.

10. The IHS of claim 1, wherein the program instructions, upon execution, cause the IHS to, in response to: (i) a hot spare feature being enabled, and (ii) a power consumption of the IHS being greater than a selected portion of a first power output of the first PSU, set the second PSU to active mode.

11. The IHS of claim 10, wherein the program instructions, upon execution, cause the IHS to select the first power output of the first PSU and a second power output of the second PSU based, at least in part, upon operating temperatures of the first and second PSUs.

12. The IHS of claim 11, wherein to select the first and second power outputs, the program instructions, upon execution, cause the IHS to optimize power conversion efficiencies of the first and second PSUs based, at least in part, upon the operating temperatures of the first and second PSUs.

13. The IHS of claim 12, wherein the program instructions, upon execution, cause the IHS to:

determine that a power conversion efficiency of the first or second PSUs with the hot spare feature enabled are lower than a power conversion efficiency of the first or second PSUs with the hot spare feature disabled; and disable the hot spare feature in response to the determination.

14. A memory device having program instructions stored thereon that, upon execution by a Power Management Unit (PMU), Embedded Controller (EC), Baseboard Management Controller (BMC), or Chassis Management Controller (CMC) of an Information Handling System (IHS), cause the PMU, EC, BMC, or CMC to:

determine that a first Power Supply Unit (PSU) thermal zone of the IHS is cooler than a second PSU thermal zone, or that the second PSU thermal zone is hotter than the first PSU thermal zone, and wherein each PSU thermal zone comprises a different physical area or location of an enclosure of the IHS; and in response to the determination, set a first PSU located in the first PSU thermal zone to active mode, and set a second PSU in the second PSU thermal zone to standby.

15. The memory device of claim 14, wherein the program instructions, upon execution, cause the PMU, EC, BMC, or CMC to, in response to a power consumption of the IHS being greater than a selected percentage or fraction of a first power output of the first PSU, set the second PSU to active mode.

16. The memory device of claim 15, wherein the program instructions, upon execution, cause the PMU, EC, BMC, or CMC to select the first power output of the first PSU and a second power output of the second PSU based, at least in part, upon operating temperatures of the first and second PSUs.

17. The memory device of claim 16, wherein to select the first and second power outputs, the program instructions, upon execution, cause the PMU, EC, BMC, or CMC to optimize power conversion efficiencies of the first and second PSUs based, at least in part, upon the operating temperatures of the first and second PSUs.

18. A method, comprising:

determining that a first Power Supply Unit (PSU) thermal zone within an enclosure of an Information Handling System (IHS) is cooler than a second PSU thermal zone, or that the second PSU thermal zone is hotter than the first PSU thermal zone, wherein each PSU thermal zone comprises a different physical area or location of an enclosure of the IHS; and in response to the determination, selecting a first power output of a first PSU in the first PSU thermal zone and a second power output of the second PSU in the second zone based, at least in part, upon: (i) operating temperatures of the first and second PSUs, and (ii) temperatures of the first and second PSU thermal zones.

19. The method of claim 18, further comprising selecting the first and second power outputs to optimize power conversion efficiencies of the first and second PSUs.

20. The method of claim 19, further comprising:

determining that the power conversion efficiencies of the first and second PSUs are lower than a power conversion efficiency of the first PSU or second PSU operating alone; and in response to the determination, setting the first PSU or the second PSU to standby.

* * * * *